US007851945B2

(12) United States Patent
Williams et al.

(10) Patent No.: US 7,851,945 B2
(45) Date of Patent: Dec. 14, 2010

(54) SYSTEM AND METHOD OF PROVIDING POWER

(75) Inventors: Gary Williams, Rowlett, TX (US); Paul Anthony Wirtzberger, Greenville, TX (US); Rico Brooks, McKinley, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 417 days.

(21) Appl. No.: 11/199,500

(22) Filed: Aug. 8, 2005

(65) Prior Publication Data

US 2007/0029979 A1 Feb. 8, 2007

(51) Int. Cl.
*H02J 3/00* (2006.01)
*H02J 1/00* (2006.01)

(52) U.S. Cl. ............................. 307/86; 307/85; 315/18

(58) Field of Classification Search ......... 315/160–164, 315/312, 313, 314, 315; 307/11, 15, 18–19, 307/23, 29, 38, 43, 52, 69, 71, 80, 84–86, 307/112–113

See application file for complete search history.

(56) References Cited

U.S. PATENT DOCUMENTS

| | | | | |
|---|---|---|---|---|
| 4,129,788 | A * | 12/1978 | Chavannes | 307/11 |
| 4,812,672 | A * | 3/1989 | Cowan et al. | 307/64 |
| 5,598,041 | A * | 1/1997 | Willis | 307/43 |
| 6,301,133 | B1 * | 10/2001 | Cuadra et al. | 363/65 |
| 6,420,906 | B1 * | 7/2002 | Kohda | 326/114 |
| 6,594,163 | B2 * | 7/2003 | Tsai | 363/50 |
| 6,600,239 | B2 * | 7/2003 | Winick et al. | 307/85 |
| 6,606,227 | B2 * | 8/2003 | Rapsinski et al. | 361/86 |
| 6,653,748 | B2 * | 11/2003 | Buchanan | 307/51 |
| 6,800,962 | B2 * | 10/2004 | Bahl et al. | 307/52 |
| 6,815,843 | B1 * | 11/2004 | Kageyama | 307/42 |
| 6,969,959 | B2 * | 11/2005 | Black et al. | 315/307 |
| 7,126,409 | B2 * | 10/2006 | Nielsen | 327/391 |
| 7,190,090 | B2 * | 3/2007 | Shi | 307/18 |
| 7,230,352 | B2 * | 6/2007 | Bedard et al. | 307/59 |
| 2003/0198048 | A1 * | 10/2003 | Frederick | 362/249 |
| 2005/0099160 | A1 * | 5/2005 | Asaumi et al. | 320/132 |
| 2005/0225177 | A1 * | 10/2005 | Jacobs et al. | 307/82 |
| 2005/0270812 | A1 * | 12/2005 | Vinciarelli | 363/65 |

* cited by examiner

*Primary Examiner*—Douglas W Owens
*Assistant Examiner*—Minh D A

(57) ABSTRACT

Circuits and methods of providing power to an electric load are disclosed. The method includes the steps of, for example, generating power via at least first and second parallel power supplies, in response to the first power supply exhibiting an over-voltage, disabling a reverse current threshold on the second power supply, turning off the first power supply when the over-voltage exceeds a threshold value, and continuing to generate power via the second power supply.

12 Claims, 6 Drawing Sheets

SYSTEM AND METHOD OF PROVIDING POWER

BACKGROUND

Computers and other electrical equipment require a reliable source of electrical energy to power their circuits. To provide such power, power architectures having a plurality of parallel power supplies serving a common load or loads have been employed. One desired feature of the parallel power supply architecture is that it ensures electronic circuits are provided with a power supply voltage that meets the using electronic circuits' operating requirements, even when one or more of the paralleled power supplies fail.

SUMMARY

According to one embodiment, a method of providing power to an electric load is disclosed. The method includes the steps of, for example, generating power via at least first and second parallel power supplies, in response to the first power supply exhibiting an over-voltage, disabling a reverse current threshold on the second power supply, turning off the first power supply when the over-voltage exceeds a threshold value, and continuing to generate power via the second power supply.

DESCRIPTION OF EMBODIMENTS

The following includes definitions of exemplary terms used throughout the disclosure. Both singular and plural forms of all terms fall within each meaning:

"Power supply" as used herein includes, but is not limited to, any source of electrical energy such as, for example, an electrical network, battery, generator, power line, transformer, or related circuitry.

"Control circuit" as used herein includes, but is not limited to, any circuit that controls, manages, or directs some function of another circuit, device, machine or component.

"Switching circuit" as used herein includes, but is not limited to, any circuit that changes between one or more states or conditions such as for example, a toggle switch, one or more switching transistors, mechanical switches, electromechanical switches, or electronic switches.

"Over-voltage sense circuit" as used herein includes, but is not limited to, any circuit that senses an over-voltage condition and performs one or more functions based thereon.

"Reverse current protection circuit" as used herein includes, but is not limited to, any circuit that senses a reverse current condition and performs one or more functions based thereon.

"Transistor" as used herein includes, but is not limited to, any solid-state electronic device that is used to control the flow of electricity in electronic equipment.

Figure 1:
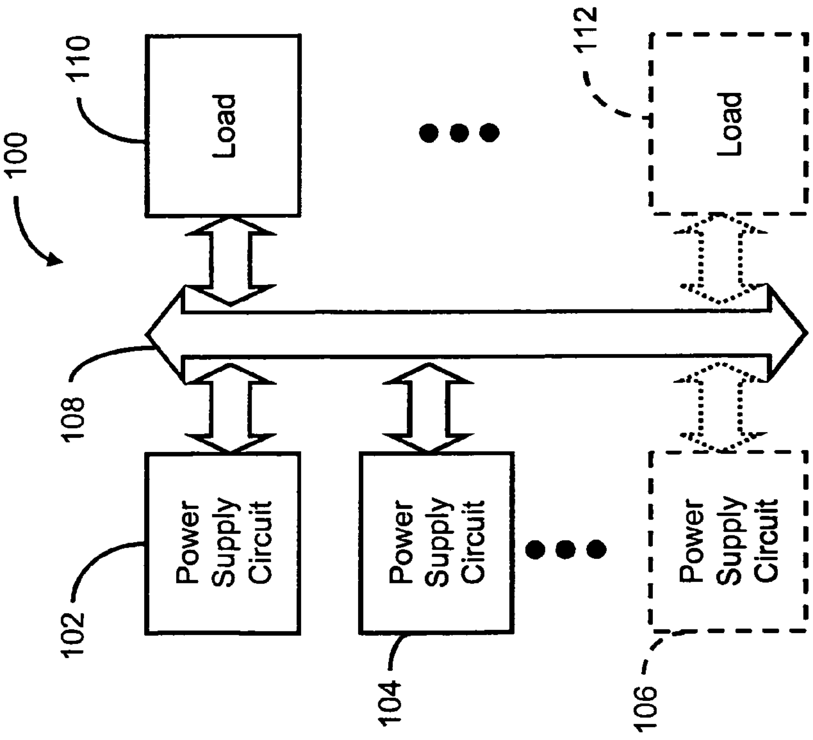
FIG. 1 illustrates one embodiment of a power supply system.

Referring now to FIG. 1, one embodiment 100 of a power supply system is shown. System 100 includes a plurality components including first and second power supply circuits 102 and 104. Additional power supply circuits may also be provided as illustrated by power supply circuit 106. The power supplies deliver electrical energy through a network or bus 108 to one or more loads such as, for example, loads 110 and 112. Loads 110 and 112 may be any type of device or machine that requires electrical energy including, for example, servers, processors, or computing systems. Power supplies 102 and 104 are generally configured in a parallel arrangement relative to the loads, though other configurations are also possible. In this arrangement, each power supply circuit attempts to provide the operating voltage required by bus 108 or load 110. Each power supply circuit includes over-voltage, under-voltage, and reverse current protection. Other protections can also be provided.

An over-voltage protection monitors the power supply's output voltage and disables the power supply when its output voltage exceeds some threshold value. An under-voltage protection monitors the power supply's output voltage and disables the power supply when its output voltage falls below some threshold value. A reverse current protection monitors the current output by the power supply and disables the power supply when there is a reverse current (i.e., current into instead out of the power supply) or when the reverse current exceeds some threshold.

Figure 2:
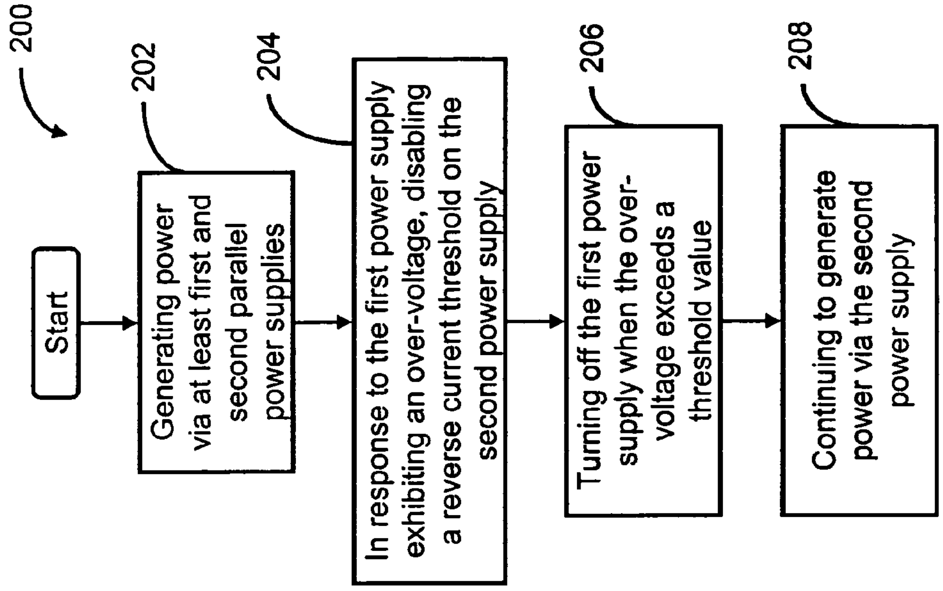
FIG. 2 is one embodiment of a flowchart illustrating the providing of power to at least one load.

Illustrated in FIG. 2 is one embodiment of a method of providing power to at least one load. The rectangular elements denote "processing blocks" that can be performed by computer software instructions, groups of instructions, and/or functionally equivalent circuits such as a digital signal processor circuit, an application-specific integrated circuit (ASIC), or analog circuitry including, for example, transistors, resistors, capacitors, diodes, inductors, etc. The flow diagram does not depict syntax of any particular programming language or circuitry. Rather, the flow diagram illustrates the process information one skilled in the art may use to fabricate circuits or to generate computer software to perform the processing of the system. It should be noted that many routine program elements, such as initialization of loops and variables and the use of temporary variables are not shown.

The process starts in block 202 where the first and second parallel power supplies generate power. Typically, each power supply is generating substantially the same output voltage, though this does not necessarily have to be the case. In block 204, in response to a first power supply exhibiting an over-voltage, a reverse current threshold on the second power supply is disabled. In block 206, the first power supply that is exhibiting an over-voltage condition is disabled or turned off when its output voltage exceeds an over-voltage threshold. In block 208, power is continued to be generated to the load via the second power supply that has not been turned off or disabled. When the over-voltage condition is removed by turning off or disabling of the power supply causing the over-voltage condition (e.g., the first power supply), the reverse current threshold in the second power supply is enabled.

Figure 3:
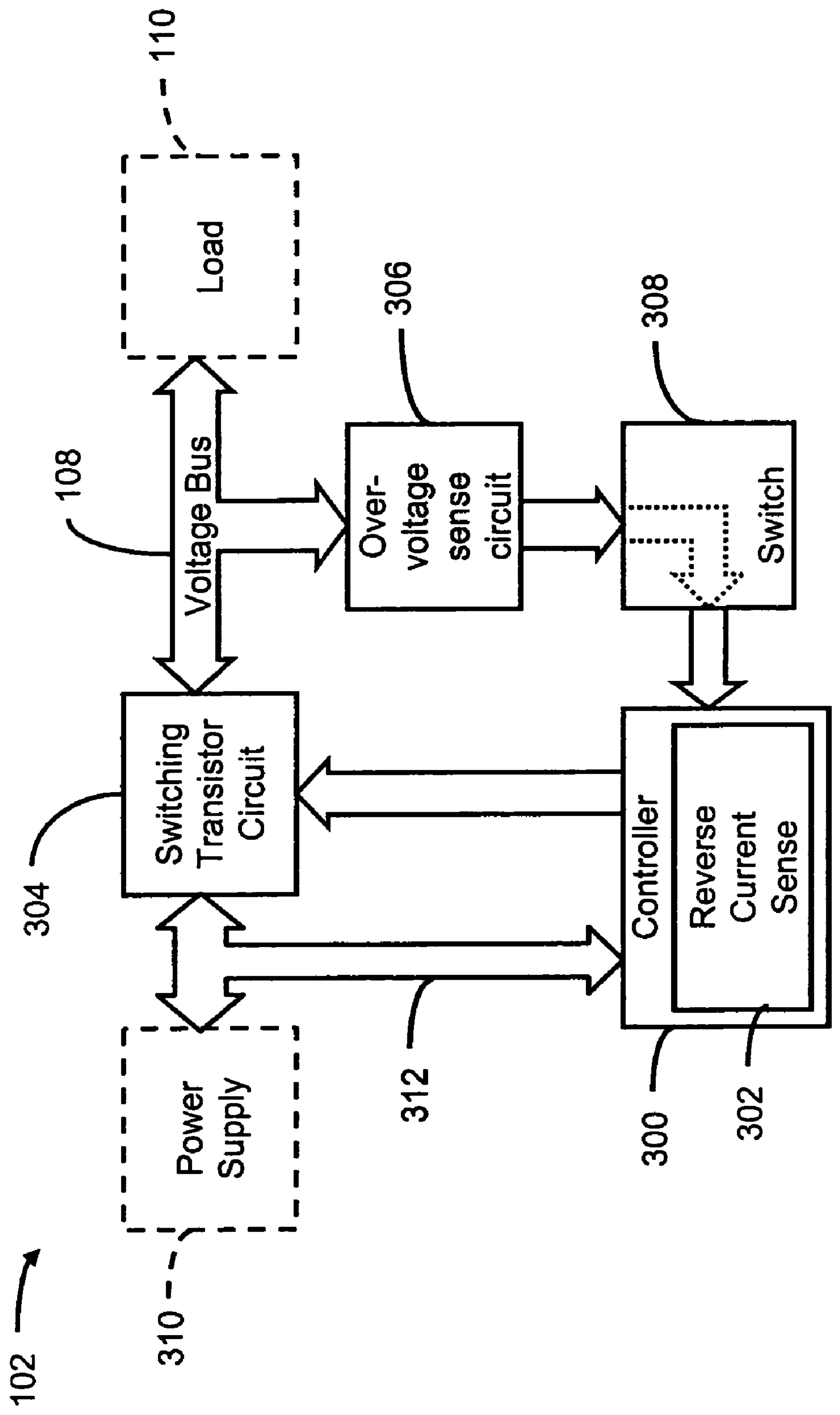
FIG. 3 illustrates one embodiment of a power supply circuit.

Shown in FIG. 3 is one embodiment of a power supply circuit 102. Power supply circuit 102 includes, for example, a control circuit 300 having a reverse current sense and protection circuit 302, a switching transistor circuit 304, an over-voltage sense circuit 306, and a switch 308. A power supply 310 provides input power that is ultimately output via voltage bus 108 to load 110. A second similar power supply circuit such as, for example, power supply circuit 104 (shown in FIG. 1) may also be connected to voltage bus 108.

In operation, power supply circuit 102 generates power to load 110. The power is generated by power supply 310 and supplied to switching transistor circuit 304. Switching transistor circuit 304 is a FET (Field Effect Transistor) switch and can include back-to-back transistors configured in an OR arrangement. While a FET transistor type is described, other types of transistors may also be suitable. Similarly, while an ORing arrangement between the transistors has been described, other configurations may also be used including, for example, a single series transistor or groups of paralleled transistors that ORed together. Controller 302 can be a transistor controller circuit that controls switching transistor circuit 302 between the states of on or off (e.g., connect or disconnect) based on a number of functions including, for example, over-voltage, under-voltage, and/or reverse current conditions.

When an over-voltage condition occurs on voltage bus 108, which can be caused by another power supply such as, for example, power supply 104 (shown in FIG. 1), the over-voltage is sensed by power supply circuit 102. The bus 108 over-voltage is sensed via an input to over-voltage sense circuit 306. Over-voltage sense circuit 306 includes one or more bus over-voltage thresholds that are compared to the voltage present on bus 108. This comparison may be a direct comparison or an indirect comparison such as, for example, through a voltage divider. When the voltage present on bus 108 exceeds at least one of the over-voltage thresholds, over-voltage sense circuit 306 outputs a control signal to switch 308. Switch 308 disconnects an input to the reverse current sense and protection circuit 302. This disables the reverse current threshold of controller 302. The reverse current sense and protection circuit 302 has two inputs. A first input is via power supply output bus 312 and a second input is via voltage bus 108. In this embodiment, switch 308 disconnects the second input deriving from voltage bus 108 so that the reverse current sense and protection circuit does not sense any reverse current across switching transistor circuit 304. This prevents power supply 102 from shutting itself off during a reverse current condition that is caused by another power supply that is going into the over-voltage condition. Once the over-voltage condition is cleared by disabling the power supply causing the condition, over-voltage sense circuit 306 outputs a control signal to switch 308 that connects the reverse current sense input derived from bus 108 to controller 302.

Figure 4:
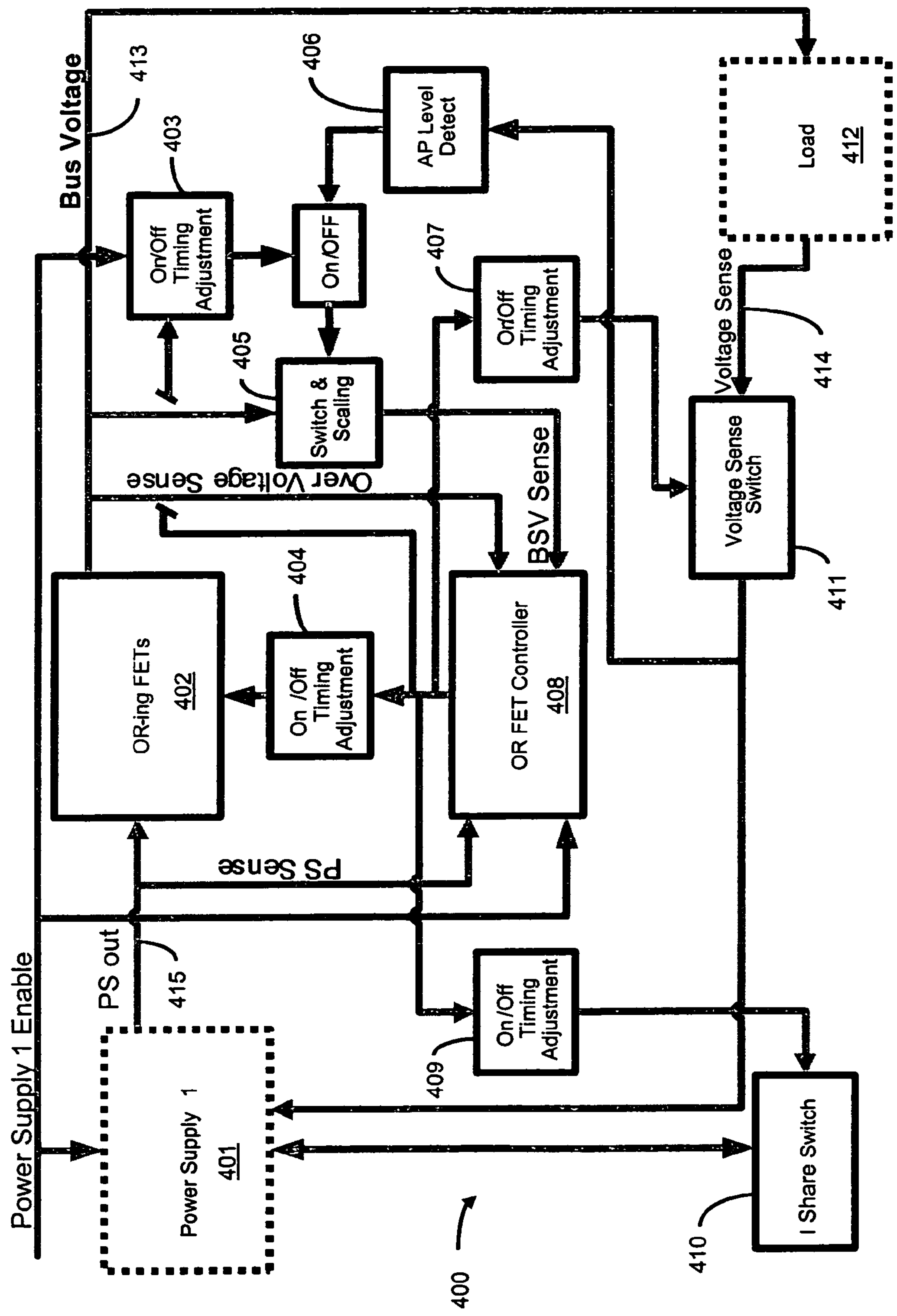
FIG. 4 illustrates another embodiment of a power supply circuit.

FIG. 4 illustrates another embodiment of a power supply circuit 102 in the form of circuit 400. A power supply enable signal enables or disables power supply 401. A group of ORing FETs 402 are configured in a paralleled arrangement to meet the current delivery requirements of the system. The FETS are configured back-to-back for full power supply failure isolation from the common voltage bus 413. ORing FETs 402 include an On state and an Off state wherein the On state allows current to flow through the FET and the Off state does not allow current to flow through the FET. As such, the ORing FETs 402 act similar to switches and are controlled by an OR FET controller 408.

An On/Off Timing Adjustment 403 provides timing adjustment of the connection of the bus side voltage (BSV) sense feedback to the OR FET Controller 408. The timing is adjusted to provide no BSV sense feedback during Turn-On and Hot Swap conditions to the OR FET Controller 408. A Turn-On condition is when a power supply is enabled and begins to provide power from a previous non-power providing condition. A Hot Swap condition is when a power supply is connected to the common voltage bus while it is enabled and ready to generate power. Adjustment 403 prevents false reverse current disabling of the OR FETs 402 during Turn-On and Hot Swap conditions with another paralleled power supply by delaying the On state of the ORing FETs 402.

An On/Off Timing Adjustment 404 provides adjustment of the Turn On/Turn Off time of the ORing FETs 402. By controlling the turn on time of the ORing FETS 402, the turn on time can be slowed down to reduce noise on the sensing lines feeding into the OR FET Controller 408. The reduced noise in the sense lines prevents false fail conditions that can be sensed by the OR FET Controller 408.

A Switch & Scaling circuit 405 works in conjunction with On/Off Timing Adjustment 403 and an AP Level Detect 406. The Switch and Scaling circuit 405 provides for a BSV sense line feedback disconnect. Circuit 405 prevents false fail conditions, such as a false reverse current condition, which results in errant turn offs of the ORing FETs 402.

AP Level 406 detects the turn off of the Voltage Sense Switch 411 on the occurrence of an over-voltage condition. An over-voltage condition occurs when the power supply is supplying a voltage greater than or equal to a predetermined protection threshold voltage. The AP Level Detect 406 also anticipates an over-voltage protection (OVP) threshold and prevents a shut down of the ORing FETs 402 by OR FET Controller 408 for a reverse current condition on a good power supply when an over-voltage condition is occurring on a failing power supply. The failing power supply will continue to rise beyond the over-voltage threshold or trip point and will be shut off by the over-voltage protection feature of its own OR FET controller. The AP Level Detect 406 assumes that an over-voltage condition and a short circuit do not happen simultaneously. A short circuit is a condition where the voltage bus is directed connected to a ground via a failed component or otherwise.

An On/Off Timing Adjustment 407 provides a delay in the connection of a voltage sense line 414 during Hot Swap and Turn On conditions. Adjustment 407 delays turning on of Voltage Sense Switch 411 during turn-on, which forces a "just enabled" power supply to regulate thru its local feedback (not shown) until its output voltage on PS out line 415 is close to the Bus Voltage on bus 413 and its OR FETs 402 are turned on. This prevents false shut downs by the OR FET Controller 408 of the ORing FETS during turn-on. These false shut downs during turn-on occur because it is common for power supplies (e.g., converters) to have a local feedback with the voltage sense lines connected to the power supply output through an impedance. In this scenario, the power supply will try to charge the common voltage bus through the voltage sense lines prior to the ORing FETs turning on and can result in the power supply reaching or exceeding the OVP set point and being shutting down.

OR FET Controller 408 provides gate drive signals to turn the ORing FETs 402 on and off. Controller 408 also provides for ORing FETs 402 turn off for over-voltage, short circuit and under-voltage conditions. OR FET Controller 408 may be, for example, a MAX8555A, MAX8535, or MAX8536 manufactured by Maxim Integrated Products, Inc. of Sunnyvale, Calif. (See MAXIM MAX8555/8555A 13-3087 (1/04) and MAXIM MAX8535/MAX8536/MAX8585 19-2735; Rev. 1; (3/04) datasheets, which are hereby incorporated by reference). Other MOSFET controllers and circuits can also be used.

An On/Off Timing Adjustment 409 provides a delay in the connection of the current share signal (I Share) during Hot Swap and Turn-On conditions. The delay is in switching an I Share Switch 410 that connects the current share signal between paralleled power supplies. This delay prevents large transients from occurring on the current share line during Hot Swap and Turn-On, which may be sensed by the power supply as a fault condition. The delay allows for the power supply 401 to reach nominal output voltage and connect to the Bus Voltage 413 before the current share signal is shared between parallel power supplies.

A load 412 represents any power consuming load connected to the Bus Voltage. The load 412 is similar to loads 110 and 112 described above may be any type of device or machine that requires electrical energy including, for example, servers, processors, or computing systems. Moreover, more than one load 412 may connected to Bus Voltage 413.

Figure 5:
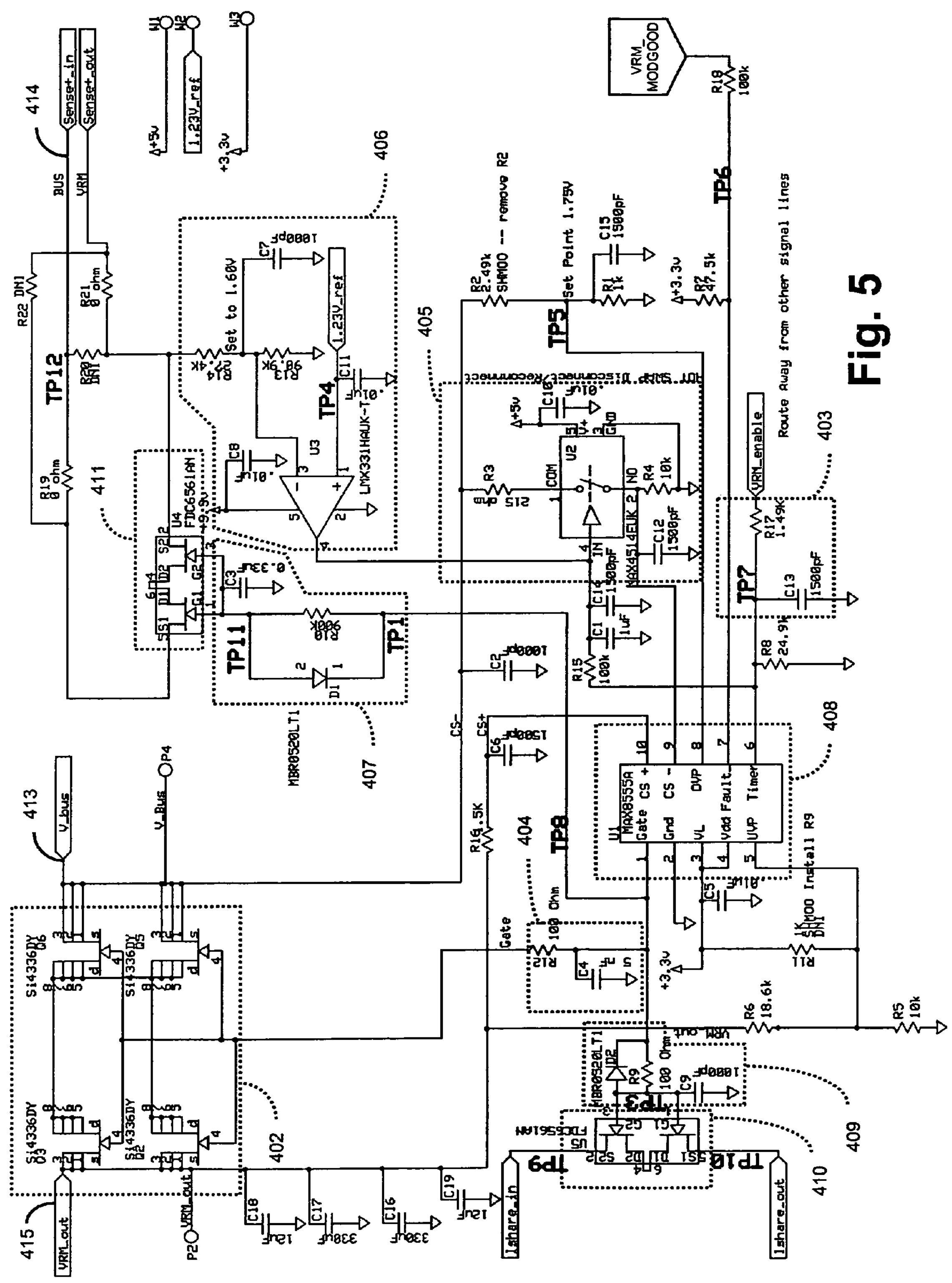
FIG. 5 illustrates one embodiment of a power supply circuit based on FIG. 4.

FIG. 5 illustrates one embodiment of power supply circuit based on the embodiment of FIG. 4. The embodiment of FIG. 5 shows the circuitry and components for power supply circuitry based on a 1.5V voltage bus. In this regard, ORing FETs 402 are shown as four FETs Q2, Q3, Q5, and Q6. FETS Q3 and Q6 are in a parallel arrangement with FETs Q2 and Q5. A power supply output voltage bus "VRM_out" provides an input to the ORing FETs 402 and a bus voltage "V_bus" provides an output from the ORing FETs 402.

On/Off Timing Adjustment 403 is shown as including, for example, resistor-capacitor circuit having R17 and C13. This circuit forms a time delay in connecting the bus side voltage sense feedback "CS−" to the OR FET Controller 408 through Switch and Scaling circuit 405. OR FET Controller 408 relies on its power supply side current sense "CS+" and bus side current sense "CS−" inputs to monitor for reverse current conditions across ORing FETs 402. The delay is provided by the time required to charge capacitor C13 when the power supply enable "VRM_enable" signal is switched on. The power supply enable signal is typically switched on during Turn-On and Hot Swap conditions. This delay during Turn-On or Hot Swap conditions disables the reverse current protection feature of OR FET Controller 408 by disabling its "CS−" input through Switch and Scaling circuit 405. Once capacitor C17 reaches charge, the delay is over and Switch and Scaling circuit 405 will change states thereby connecting the bus side voltage sense feedback "CS−" to the OR FET Controller 408.

On/Off Timing Adjustment 404 provides adjustment of the Turn On/Turn Off time of the ORing FETs 402. On/Off Timing Adjustment 404 includes, for example, a resistor-capacitor charging circuit having resistor R12 and capacitor C4. The timing adjustment is provided by the time required to charge capacitor C4 through resistor R12. Once capacitor C4 is charged, OR FETs 402 are turned on.

Switching and Scaling circuit 405 includes, for example, a normally open switch U2 that is controlled by On/Off Timing Adjustment 403 and/or AP Level Detect 406. Switch U2 connects and disconnects the bus side voltage sense feedback "CS−" from OR FET Controller 408. This enables and disables the reverse current sense feature of the OR FET Controller 408.

AP Level Detect 406 detects the turn off of the bus Voltage Sense Switch 411 on the occurrence of an over-voltage condition and also anticipates an over-voltage protection (OVP) threshold. This prevents a shut down of the ORing FETs 402 by OR FET Controller 408 for a reverse current condition on the present power supply when an over-voltage condition is occurring on a failing power supply. AP Level Detect 406 includes, for example, a comparator circuit having operational amplifier U3. Amplifier U3 is configured as a comparator and detects the turn off of the bus Voltage Sense Switch 411 on its negative terminal. Resistors R14 and R13 form a voltage divider circuit that reduces the voltage of the bus side voltage (BSV) sense line "Sense+in" input to the negative terminal of comparator U3. The positive terminal of comparator U3 is connected to a reference voltage. When the voltage on the negative terminal of U3 exceeds the reference voltage on the positive terminal, the output of comparator U3 will be driven low. This causes Switch 405 to open and disconnects the bus side current sense "CS−" input to OR FET Controller 408, which disables the reverse current protection feature of OR FET Controller 408.

By setting the negative terminal of comparator U3 to a voltage threshold that less than the over-voltage protection threshold and still above the normal operating voltage(s), AP Level Detect 406 can anticipate an over-voltage condition on the bus side by a different power supply. For example, if the over-voltage protection threshold is set to 1.75 V, the negative terminal of comparator U3 can be set to 1.60 V to anticipate the 1.75 V threshold. Other threshold values may also be used based on system requirements.

In this manner, if a separate power supply on the bus is causing the bus voltage to rise (over-voltage), the remaining power supplies will try and reduce the rising voltage back to its normal range until the deteriorating power supply shuts itself down through its own over-voltage protection. These power supplies attempt to reduce the rising voltage by allowing current back into their converters (i.e., a reverse current). AP Level Detect 406 allows for this condition to continue on the non-deteriorating power supply(ies) by disabling the bus side reverse current sense "CS−" line until the power supply causing the over-voltage condition shuts itself down when its output voltage exceeds its own over-voltage protection threshold. At this point, AP Level Detect 406 will sense the absence of the over-voltage condition and re-enable the bus side reverse current sense "CS−" line to OR FET Controller 408.

OR FET Controller 408 provides gate drive signals to turn the ORing FETs 402 on and off. OR FET Controller 408 also senses for under-voltage conditions and provides under-voltage protection "UVP" through a voltage divider circuit having R6 and R5 that sets an under-voltage protection threshold. The under-voltage protection turns off OR FETs 402 if the power supply is providing an output voltage that is less than the set threshold. OR FET Controller 408 also includes current sense inputs "CS+" and "CS−" for sensing the reverse current through OR FETs 402 and will turn off OR FETs 402 when the reverse current exceeds a threshold value. OR FET Controller 408 further includes an over-voltage protection "OVP" through a divider circuit having resistors R2 and R1, which establish an over-voltage threshold. OR FET Controller 408 compares the bus side voltage through the "CS−" line and the voltage divider to the threshold to determine if an over-voltage condition is present so as to shut off the ORing FETs 402.

Voltage Sense Switch 411 includes, for example, one or more FET circuits U4 that are turned on and off by the OR FET Controller 408 through On/Off Timing Adjustment 407. Switch 411 connects and disconnects the bus side voltage sense "Sense+_in" line to AP Level Detect 406. On/Off Timing Adjustment 407 is configured to delay connection of a voltage sense line 414 during Hot Swap and Turn On conditions. This delay in the turning on of Voltage Sense Switch 411 is accomplished through the use of an resistor-capacitor charging circuit having resistor R10 and capacitor C3. The delay is a result of the time required to charge capacitor C3 through resistor R10. On/Off Timing Adjustment 407 also includes a diode D1, which provides for quick discharge of the FET circuit U4 gate terminals and quickly turns off or opens Voltage Sense Switch 411.

On/Off Timing Adjustment 409 provides a delay in the connection of the current share signal (I Share) during Hot Swap and Turn-On conditions. On/Off Timing Adjustment 409 includes, for example, a resistor-capacitor charging circuit having resistor R9 and capacitor C9. The delay is provided by the time required to charge capacitor C9 through resistor R9. A diode D2 is also provided for quick discharge and disconnect of the I Share Switch 410.

The I Share Switch 410 connects the current share signal between paralleled power supplies to implement a current sharing function between the paralleled supplies. An On/Off Timing Adjustment 409 provides a delay in the connection of the current share signal (I Share) during Hot Swap and Turn-On conditions. The delay is in switching an I Share Switch 410 that connects the current share signal between paralleled power supplies. This delay prevents or reduces large transients from occurring on the current share line during Hot Swap and Turn-On, which may be sensed by the power supply as a fault condition. The delay allows for the power supply 401 to reach nominal output voltage and connect to the Bus Voltage 413 before the current share signal is shared between parallel power supplies. The I Share Switch 410 includes, for example, a FET circuit U5 that is configured as a switch. Its input includes a current share in "Ishare_in" signal from the power supply and current share out "Ishare_out" to the next paralleled power supply.

Figure 6:
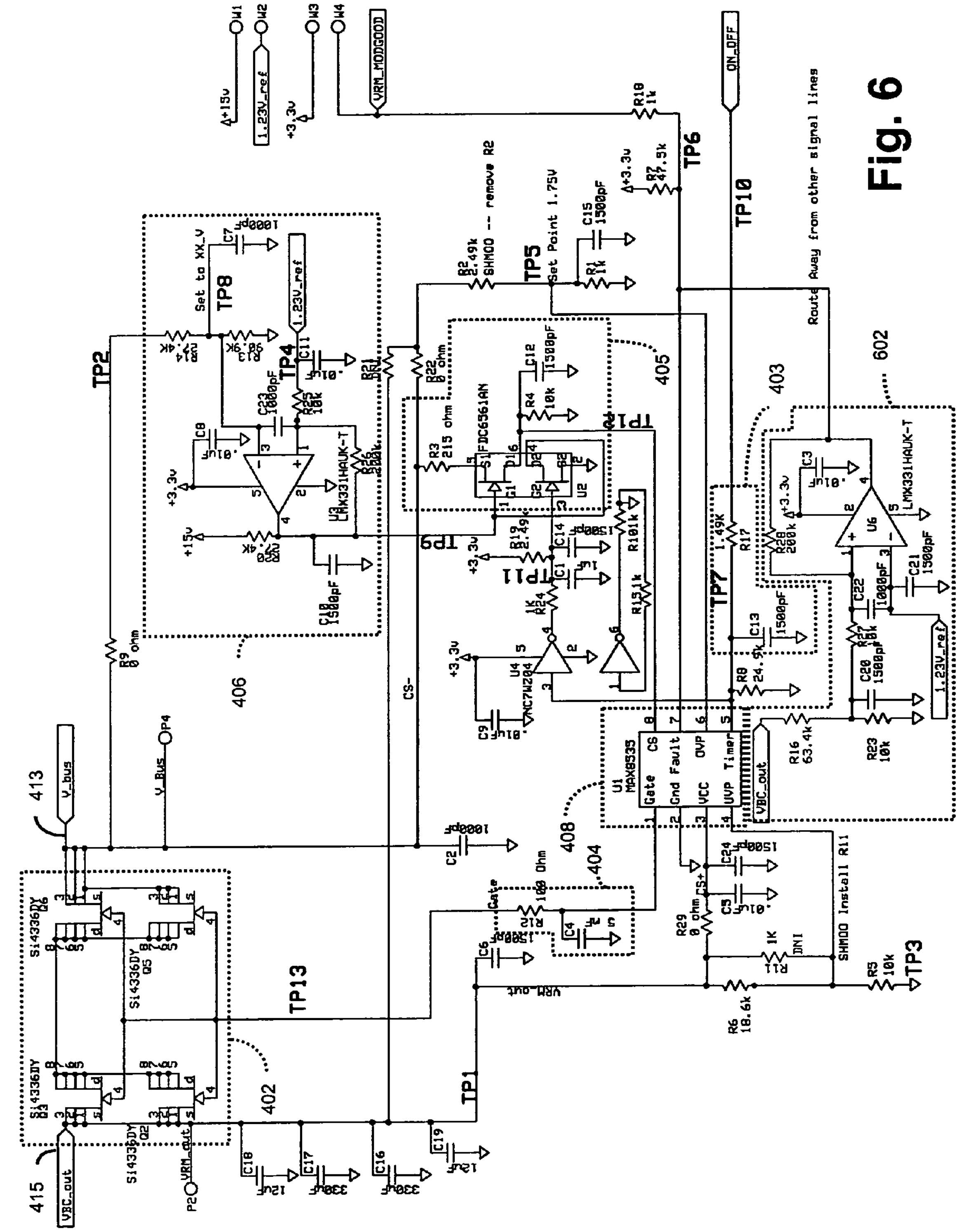
FIG. 6 illustrates another embodiment of a power supply circuit.

FIG. 6 illustrates another embodiment of a power supply circuit that includes less than all of the components of the embodiment of FIG. 4. The embodiment of FIG. 6 shows the power supply circuitry based on a 12V voltage bus. The circuitry and component values used for implementing ORing FETs 402, On/Off Timing Adjustments 403 and 404, Switch and Scaling circuit 405, AP Level Detect 406, and OR FET Controller 408 are as shown. Additionally, a status circuit 602 provides a functioning status signal (VRM_MODGOOD) to still be present when the VRM_out signal 415 is no longer present. The FET controller 408 derives its operating power from the VRM_out signal 415 and as such when the VRM_out signal 415 is shut off due to a fault, the status signal from the FET Controller 408 indicating a fault (e.g., an over-voltage, under-voltage, or reverse-current fault) may not be valid. Circuit 602 provides additional fault status indication under these circumstances. Circuit 602 includes a comparator U6 that compares the VRM_out signal 415 (also shown as VBC_out) to a threshold value (e.g., 1.23 V) and provides a logic HI output as long as the VRM_out signal 415 is greater than the threshold value. This output serves as the VRM_MODGOOD signal.

Figure 7:
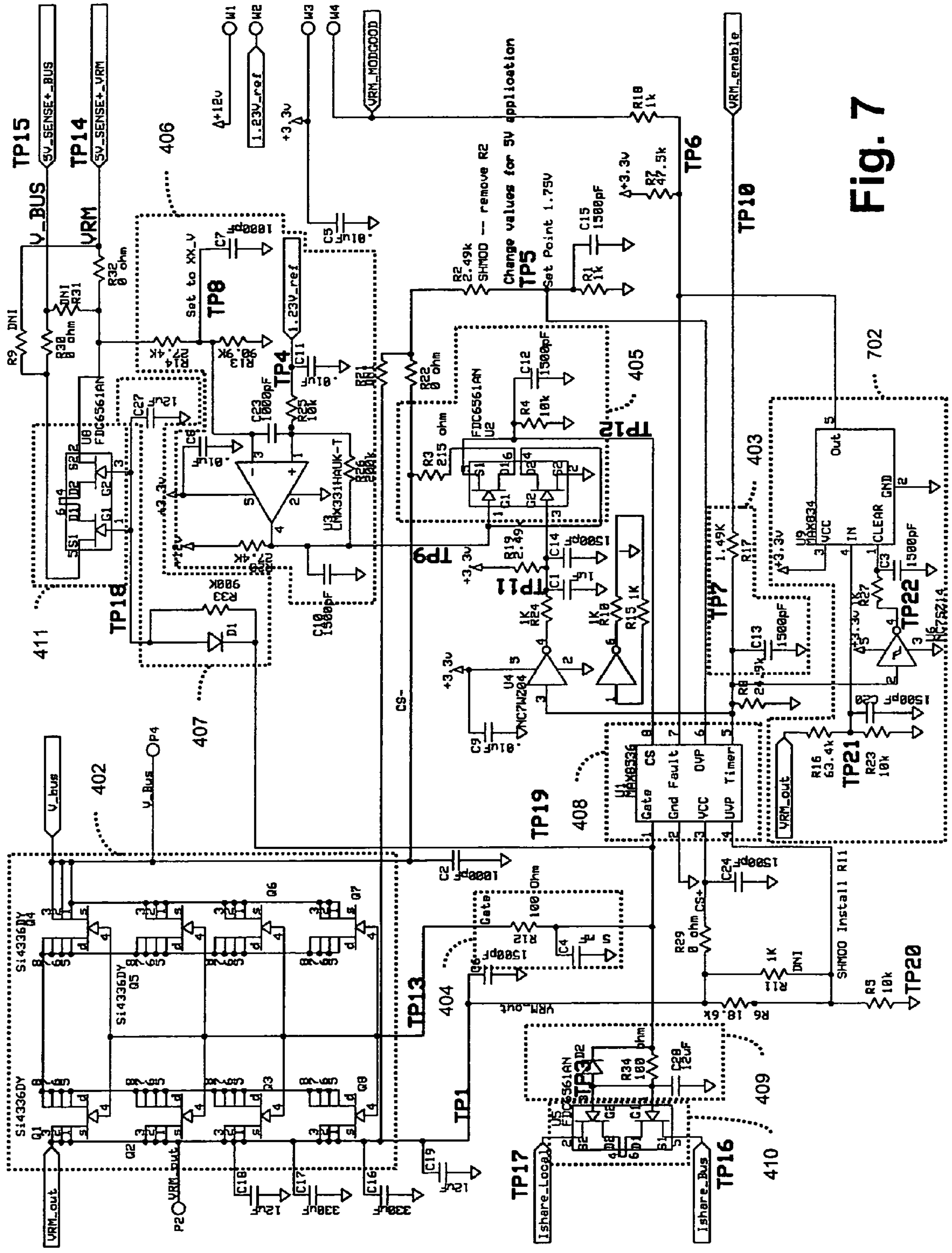
FIG. 7 illustrates yet another embodiment of a power supply circuit.

FIG. 7 illustrates yet another embodiment of a power supply circuit that includes all of the components of the embodiment of FIG. 4. The embodiment of FIG. 7 shows the power supply circuitry based on a 5V voltage bus. The circuitry and component values used for implementing ORing FETs 402, On/Off Timing Adjustments 403, 404, 407, and 409, Switch and Scaling circuit 405, AP Level Detect 406, On/Off Timing Adjustment 407, OR FET Controller 408, I Share Switch 410 and Voltage Sense Switch 411 are all as shown. Additionally, a status circuit 702 provides a functioning status signal (VRM_MODGOOD) to still be present when the VRM_out signal 415 is no longer present. Status circuit 702 is similar to status circuit 602 but is shown as a different embodiment. As described above in connection with status circuit 602, the FET controller 408 derives its operating power from the VRM_out signal 415 and when the VRM_out signal 415 is shut off due to a fault, the status signal from the FET controller 408 indicating a fault is may not be valid and thus circuit 702 provides fault status through the VRM_MODGOOD signal. Status circuit 702 includes a latching voltage monitor U9 that monitors the VRM_out signal through voltage divider R16 and R23. The modified VRM_out signal is compared to a threshold value (e.g., 3.3 V) on the VCC input of U9. When the modified VRM_out signal falls below the input on VCC, the output of U9 sends a logic HI signal on the VRM_MODGOOD line.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, component values and circuitry can be changed without changing the substantive functions performed by the components and circuitry described herein. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed:

1. A method of providing power to an electric load comprising:

generating power via at least first and second parallel power supplies;

in response to the first power supply exhibiting an over-voltage, disabling a reverse current threshold on the second power supply, turning off the first power supply when the over-voltage exceeds a threshold value, and continuing to generate power via second power supply.

2. The method of claim 1 wherein disabling a reverse current threshold on the second power supply comprises disconnecting a reverse current sense.

3. The method of claim 1 wherein turning off the first power supply when the over-voltage exceeds a threshold value comprises sensing an over-voltage condition associated with the output of the first power supply and disconnecting its output.

4. The method of claim 1 wherein continuing to generate power via the second power supply comprises re-enabling the reverse current threshold on the second power supply.

5. The method of claim 1 wherein continuing to generate power via the second power supply comprises enabling the reverse current threshold on the second power supply after turning off the first power supply.

6. The method of claim 1 wherein disabling a reverse current threshold on the second power supply comprises disconnecting a reverse current sense on a controller.

7. The method of claim 1 wherein continuing to generate power via the second power supply comprises enabling the reverse current threshold on a controller.

8. A power supply circuit for providing electric power to at least one load in a parallel power supply system, the power supply circuit comprising:

a first power supply configured to generate a voltage on a bus that interconnects the at least one load and at least one second power supply circuit;

a reverse current sense and protection circuit configured to sense a reverse current condition associated with the first power supply; and a controller configured to disable the first power supply if the voltage exceeds a predetermined protection threshold voltage and to disable the reverse current sense and protection circuit in response to detecting an overvoltage condition on the bus.

9. The power supply circuit of claim 8, wherein the controller is configured to disconnect an output associated with the power supply from the bus in response to the voltage on the bus exceeding a predetermined protection threshold voltage.

10. The power supply circuit of claim 8, further comprising a level detector configured to detect a disablement of the at least one additional power supply circuit in response to the overvoltage condition and to re-enable the reverse current sense and protection circuit in response to detecting the disablement of the at least one additional power supply circuit.

11. The power supply circuit of claim 8, further comprising a switching circuit that comprises a plurality of switches, the switching circuit being, configured to provide isolation of the power supply from the bus, the reverse current sense and protection circuit being configured to sense the reverse current condition across the switching circuit.

12. The power supply circuit of claim 8, wherein the overvoltage condition on the bus is due to the at least one second power supply circuit.

* * * * *

UNITED STATES PATENT AND TRADEMARK OFFICE

CERTIFICATE OF CORRECTION

PATENT NO. : 7,851,945 B2
APPLICATION NO. : 11/199500
DATED : December 14, 2010
INVENTOR(S) : Gary Williams et al.

It is certified that error appears in the above-identified patent and that said Letters Patent is hereby corrected as shown below:

In column 8, line 38, in Claim 1, delete “via second” and insert -- via the second --, therefor.

In column 10, line 6, in Claim 11, delete “being,” and insert -- being --, therefor.

Signed and Sealed this
Third Day of May, 2011

David J. Kappos
*Director of the United States Patent and Trademark Office*